United States Patent
Sauermann

(10) Patent No.: US 7,454,454 B2
(45) Date of Patent: Nov. 18, 2008

(54) METHOD AND APPARATUS FOR EFFICIENT CALCULATION OF A MATRIX POWER SERIES

(75) Inventor: Volker Sauermann, Heidelberg (DE)

(73) Assignee: SAP AG, Walldorf (DE)

( * ) Notice: Subject to any disclaimer, the term of this patent is extended or adjusted under 35 U.S.C. 154(b) by 710 days.

(21) Appl. No.: 10/851,585

(22) Filed: May 21, 2004

(65) Prior Publication Data

US 2005/0259585 A1   Nov. 24, 2005

(51) Int. Cl.
   *G06F 7/38* (2006.01)
(52) U.S. Cl. .................. 708/520; 708/606; 708/607
(58) Field of Classification Search ............. 708/277, 708/520, 606, 607
   See application file for complete search history.

(56) References Cited

U.S. PATENT DOCUMENTS

| | | | | |
|---|---|---|---|---|
| 5,388,058 A | * | 2/1995 | Yamada | 708/200 |
| 5,717,621 A | * | 2/1998 | Gupta et al. | 708/446 |
| 5,974,436 A | * | 10/1999 | Inoue et al. | 708/606 |
| 6,052,704 A | * | 4/2000 | Wei | 708/492 |
| 2004/0044710 A1 | * | 3/2004 | Harrison et al. | 708/200 |

* cited by examiner

*Primary Examiner*—Chuong D Ngo
(74) *Attorney, Agent, or Firm*—Kenyon & Kenyon LLP

(57) ABSTRACT

The present invention provides a method and system for computing a matrix power series according to one embodiment of the present invention. Memory structures for storing a partial sum, current and previous series terms are allocated. First and second pointers are assigned to refer to a memory location storing a current series term and a previous series term respectively. During each phase of a process to compute a current partial sum, the pointers are exchanged.

20 Claims, 9 Drawing Sheets

METHOD AND APPARATUS FOR EFFICIENT CALCULATION OF A MATRIX POWER SERIES

FIELD OF THE INVENTION

The present invention relates to the areas of information systems. In particular, the present invention provides a method and system for efficient calculation of a matrix power series.

BACKGROUND INFORMATION

A matrix power series is represented as:

$$F(A) = \sum_{i=1}^{n} A^i,$$

where A is a matrix with respective entries $a_{ij}$. In performing such a calculation, one may refer to $$S_i = \sum_{j=1}^{i} A^j$$

as the ith partial sum.

The calculation of such a power series for a matrix may arise in many contexts. For example, in graph theory, one may desire to analyze paths and their respective efficiencies (i.e., shortest, fastest, cheapest, etc.) through a graph connecting a set of nodes. A graph is a set of nodes and a set of paths interlinking some or all of the nodes. Graphs are used to solve many types of problems, such as finding the shortest, cheapest and/or fastest path between two places represented by nodes of a graph. Often graphs are used to give an answer to the question whether at least one path exists at all between two nodes.

For example, a complex networking topology comprising many different servers can be modelled by a graph. The graph can be used to find out whether there is at least one way for two specific servers to reach each other and connect to each other.

The following formalism can solve this type of problem. A graph G=(P, B) with nodes from a set P={$p_0, p_1, p_2, \ldots, p_{n-1}$} and paths from a set B $\subseteq$ P×P may be represented by the following n×n matrix:

A(G)=($a_{ij}$) where $a_{ij}$={1 if ($p_i, p_j$) ∈ B; 0 else} A(G) is called an adjacency matrix. In the case of a non-directed graph, each path between two nodes has an opposite path, so the adjacency matrix is symmetric.

From graph theory, it is known that when raising the adjacency matrix to power k an element $a^k_{ij}$ of the resulting matrix $(A(G))^k$ corresponds to the number of paths with length k from node $p_i$ to node $p_j$. The maximum path length in a graph consisting of n nodes is n. In longer paths, at least one node is visited two times.

A matrix W may be defined that indicates whether or not a path exists between two nodes $p_i$, $p_j$ of a graph. The path matrix of a graph G is defined as $W(G)=\text{sig}(A+A^2+A^3+ \ldots +A^n)$ where sig is the sign function for a matrix M, defined as:

$\text{sig}(M)=\text{sig}(m_{ij})=\{1 \text{ if } m_{ij} \neq 0; 0 \text{ else}\}$ Thus, calculation of the path matrix W requires computation of a matrix power series as defined above. A method is needed for calculating such a series.

A matrix power series may arise in many other areas of computation. For example, the familiar matrix exponential expression:

$$e^A = \sum_{n=0}^{\infty} \frac{A^n}{n!}$$

arises often in linear algebraic equations such as solutions to a coupled set of linear differential equations.

Known methods for calculating such a matrix polynomial typically involve an iterative process in which each matrix power in the series is computed and then stored. Upon the generation of all the terms of the series, the series is summed to provide the final result. For example, given the matrix A, first matrix $A^2$ is calculated and stored, then matrix $A^3$ is calculated and stored, and so on until matrix $A^n$ is reached. Finally, all powers $A^1, \ldots, A^n$ of matrix A are summed. From this sum, the path matrix is calculated in the last step.

The disadvantage of this approach is that memory consumption may be very large, since all intermediate results (the terms $A^1, \ldots, A^n$) must be kept in memory until the sum is calculated. For example, if n=1000, then each matrix A contains $1000^2$=1 million entries. Since 1000 matrix powers have to be calculated, a total of $10^9$ matrix elements must be kept in memory, or written temporarily on disk if the memory is not sufficient. If each of the matrix elements is a 4-byte integer value, then about 4 GB of memory or disk space is needed. Therefore, even for relatively small n, this simple method of calculating the path matrix is not very useful.

Thus a need exists for an efficient method for calculating a matrix power series.

DETAILED DESCRIPTION

The present invention provides a method and system for computing a matrix power series according to one embodiment of the present invention. Memory structures for storing a partial sum, current and previous series terms are allocated. First and second pointers are assigned to refer to a memory location storing a current series term and a previous series term respectively. During each phase of a process to compute a current partial sum, the pointers are exchanged.

In general, the following computation is desired:

$$F(A) = \sum_{i=1}^{n} A^i,$$

where A is a matrix with respective entries $a_{ij}$

According to the present invention, a method for memory efficient and fast computation of a matrix power series is achieved by noting a recursion relation.

$$A^i = AA^{i-1}$$

$$S_i = S_{i-1} + A^i$$

where term $A^{i-1}$ is the previous series term, $A^i$ is the current series term and $$S_i = \sum_{j=1}^{i} A^j$$

is the ith partial sum.

From the above recursion relation, evidently, only four data elements must be maintained during the computation of a matrix power series: the matrix itself A, the previous series term $A^{i-1}$, the current series term $A^i$, and the ith partial sum $$S_i = \sum_{j=1}^{i} A^j.$$

This insight informs an efficient method for computation of matrix power series.

Figure 1:
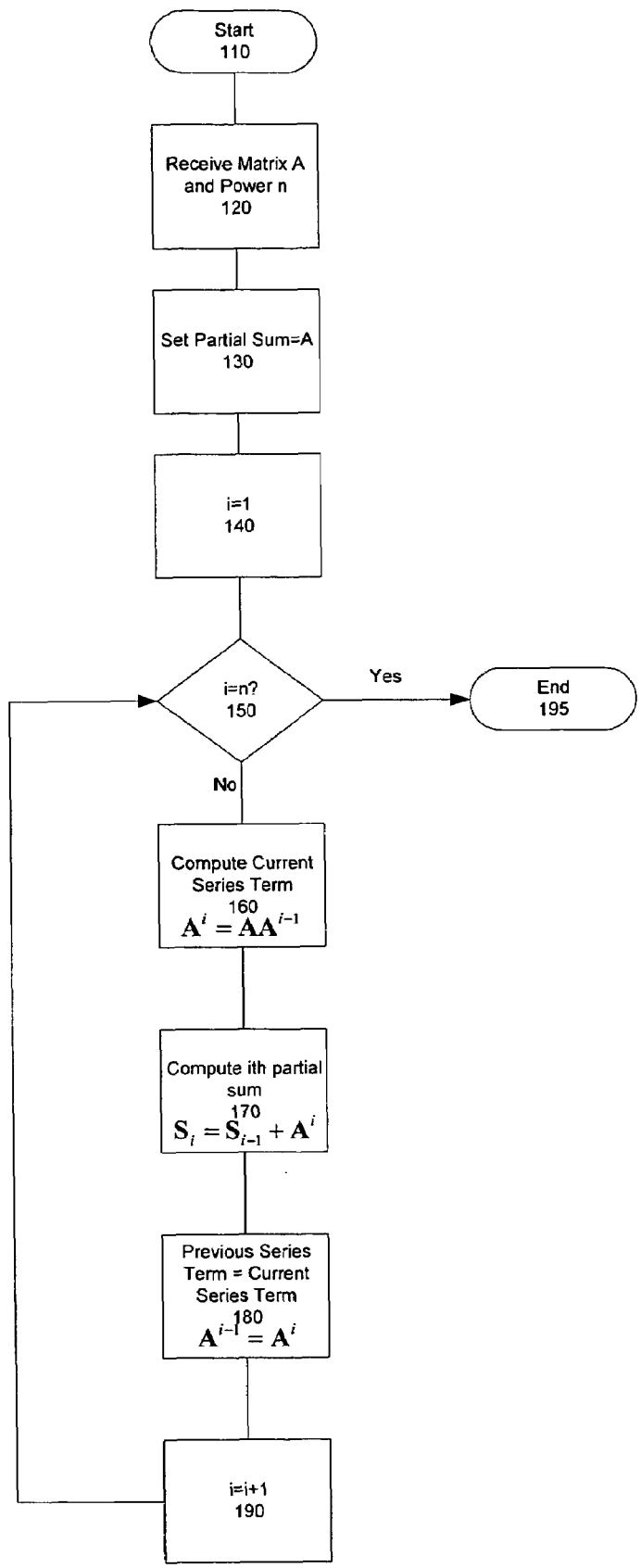
FIG. 1 is a flowchart for computation of a matrix power series utilizing a recursive process according to one embodiment of the present invention.

FIG. 1 is a flowchart for computation of a matrix power series utilizing a recursive process according to one embodiment of the present invention. The process is initiated in step 110. In steps 120-140, variables are received and the process is initialized. Specifically, in step 120 the matrix A and associated power n are received. In step 130, the partial sum $S_1$ is set to equal A ($S_1 = A$). In step 140 a counter (i) is set to the value 1.

In steps 150-190, a loop is iterated to compute the power series. In particular, in step 150, it is determined whether i=n. If not ('no' branch of step 150), in step 160 a current series term is calculated in step 160 ($A^i = AA^{i-1}$). If I=n ('yes' branch of step 150), the process ends in step 195.

In step 170, the ith partial sum is calculated ($S_i = S_{i-1} + A^i$). In step 190, the previous series term is set to be equal to the current series term ($A^{i-1} = A^i$). In step 190, the counter (I) is incremented such that i=i+1.

Figure 2:
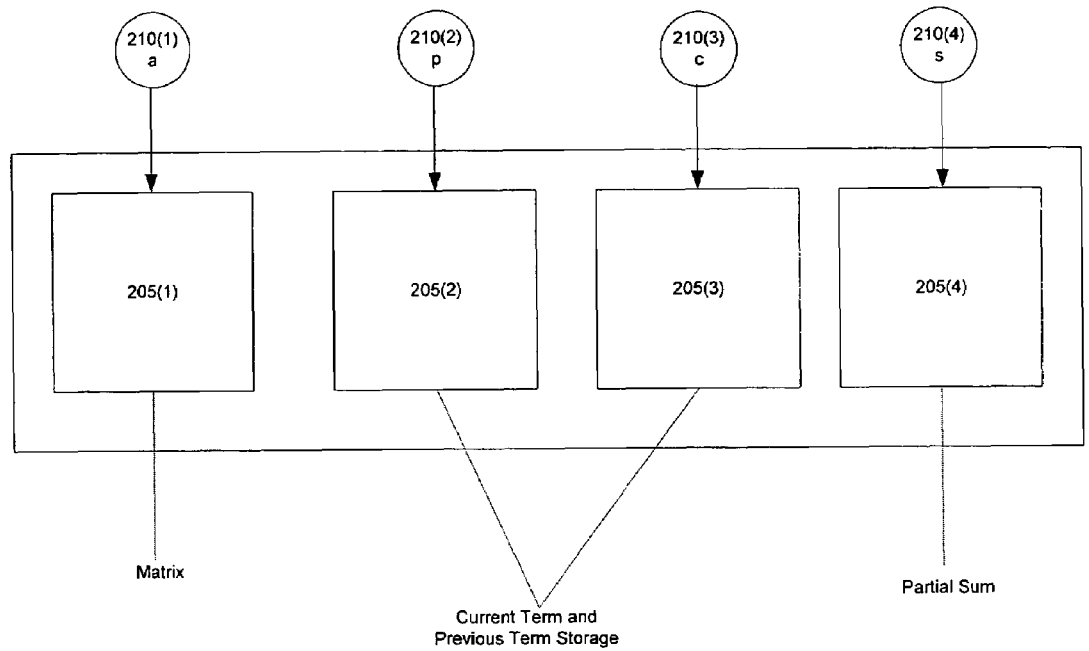
FIG. 2 shows a block diagram of a memory structure for computing a matrix power series according to one embodiment of the present invention.

FIG. 2 shows a block diagram of a memory structure for computing a matrix power series according to one embodiment of the present invention. Note, as shown in FIG. 2, only four data elements must be maintained for computation of a matrix power series. In particular, FIG. 2 shows first, second, third and fourth memory areas 205(1)-205(4). Memory area 205(1) provides storage for a matrix A. Memory areas 205(2) and 205(3) provide for temporary storage of a previous term $A^{i-1}$ and a current power term $A^i$. Memory location 205(4) provides for the storage of a current partial sum $S_N$.

Also shown in FIG. 2 are first, second, third and fourth pointers 210(1)-210(4). Pointers 210(1)-210(4) may be set to point to any of respective memory areas 205(1)-205(4). For example, as shown in FIG. 1, pointers 210(1)-210(4) are set to point to memory areas 205(1)-205(4) respectively. For notational convenience, the following convention is adopted herein for the designation of pointers 210(1)-210(4): 210(1) =a, 210(2)=p(revious), 210(3)=c(urrent) and 210(4)=s(um).

According to one embodiment, pointers p (210(2)) and c (210(3)) respectively pointing to the previous and current term in the series computation are exchanged upon every phase of an iteration. As will become evident as the invention is described further, the exchange of pointers p and c during each phase of the iteration provides for increased efficiency in the computation of a matrix power series.

In particular, according to one embodiment of the present invention, at the beginning of each phase of a process to calculate a matrix power series, pointers p and c are exchanged during each iteration of the algorithm. Thus, for example, during a first phase of the process ɸ, pointer p and pointer c point to memory area 205(2) and 205(3) respectively. During a second phase ɸ' of the process the pointer references are swapped and pointer p is set to point to memory area 205(3) while pointer c is set to point to memory area 205(2). The function of the exchange process will become evident as the invention is further described.

The following pseudo-code implements an efficient computation of a matrix power series according to one embodiment of the present invention. The following notation convention is applied in the pseudo-code. a*, p*, c*, s* refer to memory areas referenced by pointers a, p, c and s respectively. Thus c*=(a*)(p*) means replace the contents of memory referenced by c with the product of the matrix in memory referenced by pointer a with the matrix in memory referenced by pointer p:

```
{
    Matrix * a, p, c, s;
    Allocate memory areas a, p, c, s, temp*;
    Receive Matrix A;
    a*=b*=c*=s*=A; initialize memory areas with matrix A;
    Count=1;
    Do While Count<=n;
    {
        % Phase phi and phase phi'
        c*=(a*)(p*);
        s*=s*+c*;
        temp=p;
        p=c;
        c=temp;
        count++;
    }
}
```

Figure 3:
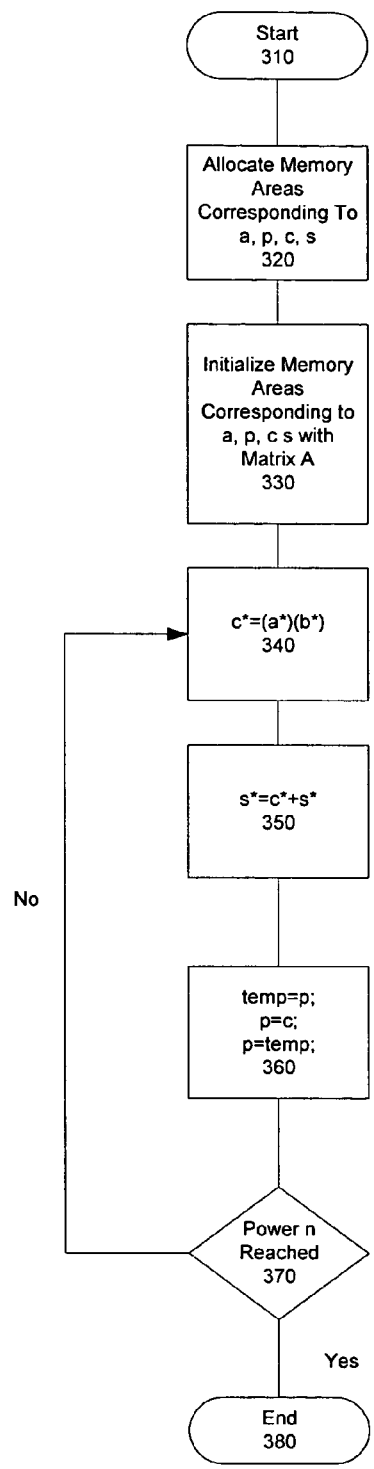
FIG. 3 is a flowchart depicting a process for computing a matrix power series according to one embodiment of the present invention.

The above-pseudo code is explicated by reference to FIG. 3, which is a flowchart depicting a process for computing a matrix power series according to one embodiment of the present invention.

The process is initiated in step 310.

Steps 320-330 relate to an initialization process. Specifically, in step 320, memory areas referenced by a for storage of the matrix (205(1)), p for storage of a current series term (205(2)), c for storage of a current term (205(3)) and s for storage of a partial sum term (205(4)) are allocated. In step 330, the matrix A is stored in memory areas referenced by a, p, c and s.

Steps 340-370 relate to an iterative loop for the computation of a matrix power series. Specifically, in step 340 the product of the matrix A and the matrix stored in the memory location referenced by the pointer p (previous) ($A^i=AA^{i-1}$) is stored in the memory area referenced by the pointer c (current). In step 350, the partial sum $S_i=S_{i-1}+A^i$ is computed by taking the sum of the matrix stored in memory referenced by pointer s and the matrix stored in memory referenced by pointer c. In step 360, the pointers p and s are exchanged such that p now points to the memory location storing the current series term and s now points to the memory location storing what was the previous series term. In this manner, the current series term is maintained as it is now referenced by p, while the memory location referenced by c is now ready for storage of the new current term in the next iteration.

In step 370, it is determined whether the power n has been reached (i.e., the iteration has occurred n times). If not ('no' branch of step 370) the process continues with step 340. If so ('yes' branch of step 370), the process ends in step 380.

Figure 4:
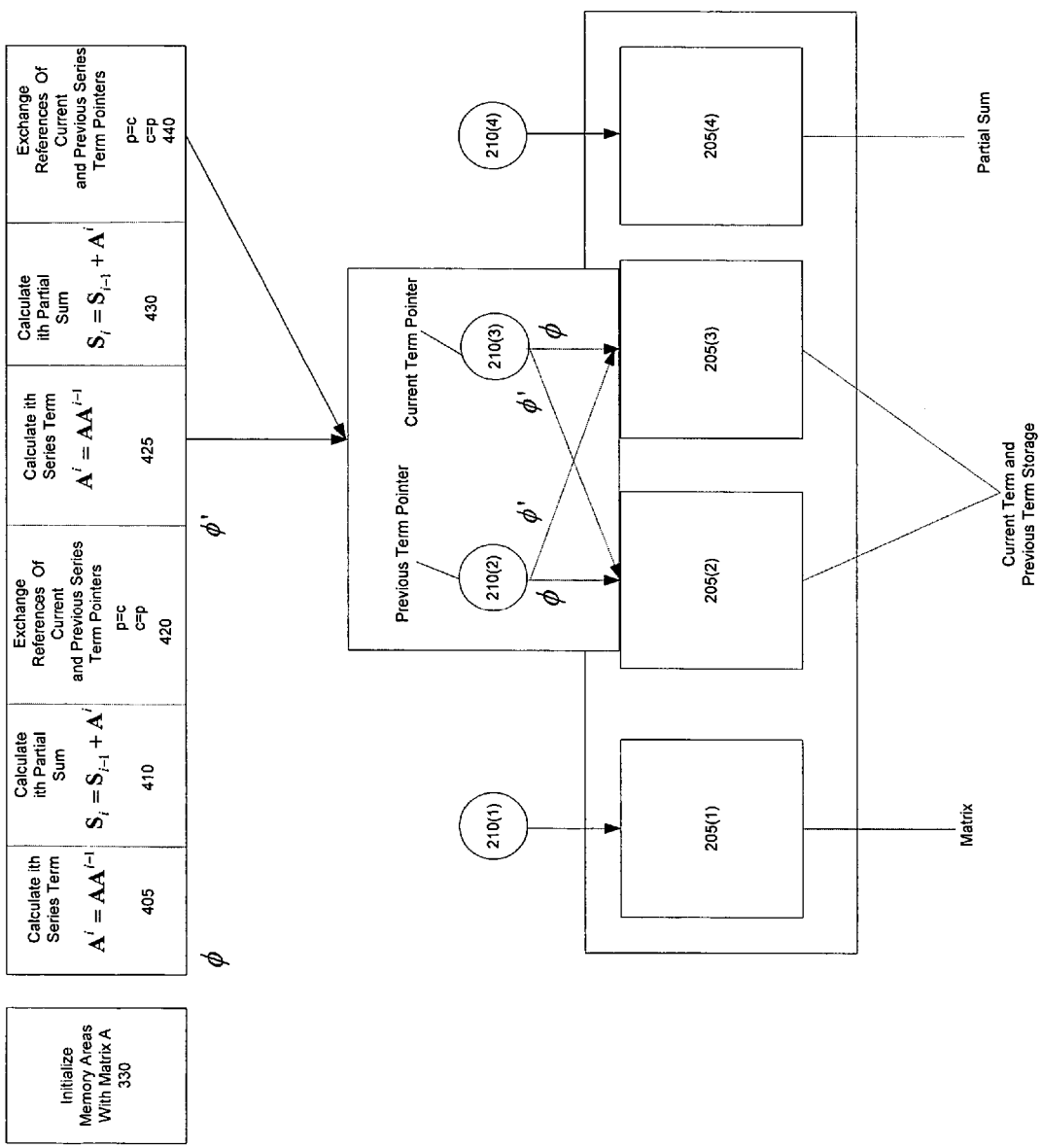
FIG. 4 is a block diagram that illustrates the relationship between the pointers a, p, c and s and associated memory structures and the execution of the process according to one embodiment of the present invention.

FIG. 4 is a block diagram that illustrates the relationship between the pointers a, p, c and s and associated memory structures and the execution of the process according to one embodiment of the present invention. Note that the process may be conceived as occurring over two phases φ and φ' where the pointers p and c are exchanged each phase. At the end of the interval φ-φ' the initial state with respect to memory areas 205(1)-205(4) and respective pointers a, p, c and s is achieved defining a period of iteration. During the first phase φ (405-420), a series term is computed and the partial sum updated. For the sake of example, referring to the lower portion of FIG. 4, it is assumed that pointers p and c during this phase respectively reference memory areas 205(2) and 205(3). In particular, in step 405, the ith series term is computed ($A^i=AA^{i-1}$). In step 410, the ith partial sum is computed ($S_i=S_{i-1}+A^i$). In step 420, the pointers p and c are exchanged as described above. Referring to the lower portion of FIG. 4, pointers p and c now respectively reference memory areas 205(3) and 205(2).

During the second phase of the iteration φ', the same process of steps (405, 410, 420) are executed except that pointers p and c have been swapped during this phase. In step 440, pointers p and c are exchanged once again establishing once again the initial state with respect to memory areas 205(1)-205(4) and pointers p and c.

Figure 5A:
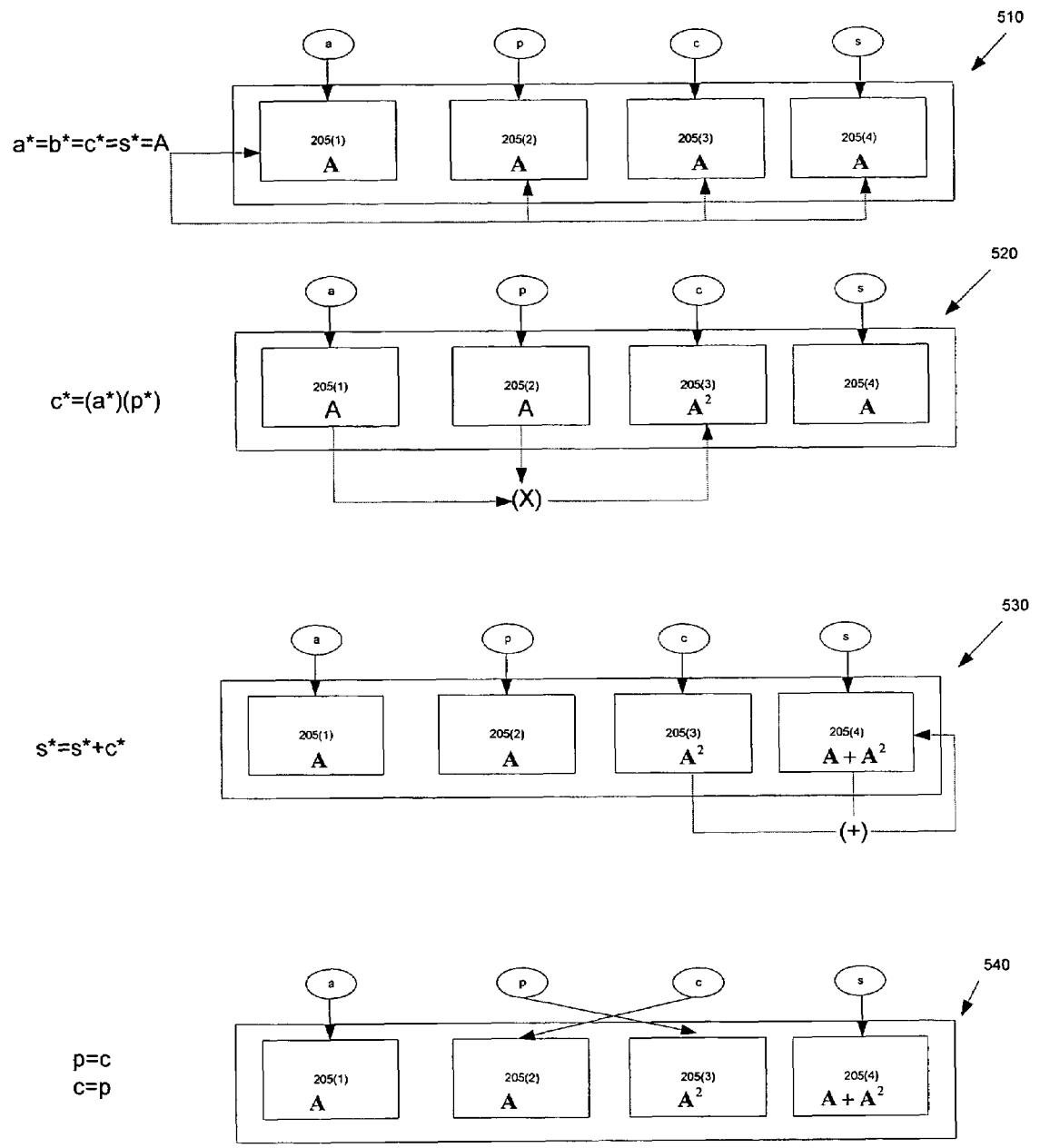
FIGS. 5a-5b illustrate an exemplary computation of a few terms of a matrix power series according to one embodiment of the present invention.
Figure 5B:
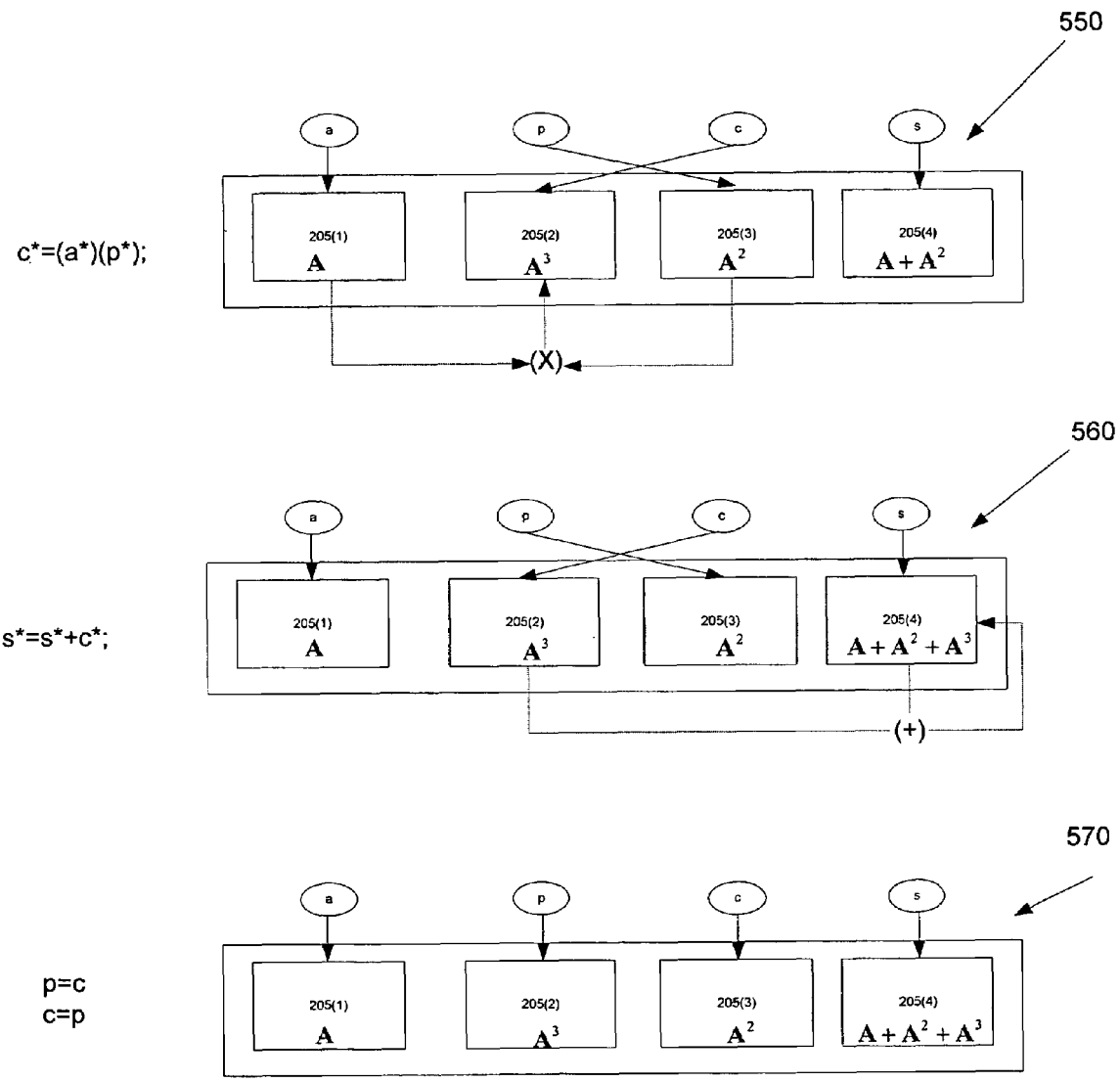

FIGS. 5a-5b illustrate an exemplary computation of a few terms of a matrix power series according to one embodiment of the present invention. FIG. 5a relates to the first phase φ while FIG. 5b relates to the complementary phase φ'.

Referring to FIG. 5a, in 510 memory areas 205(1)-205(4) are initialized with matrix A. Note, at this step $S_1=A$. In 520, the $A^2$nd series term $A^2$ is computed ($A^i=AA^{i-1}$) and stored in the memory area referenced by c (in this case 205(3)). In 530, the partial sum $S_2=A+A^2$ is computed ($S_i=S_{i-1}+A^i$). In 540, pointers p and c are exchanged such that p now points to 205(3) and c now points to 205(2). Thus, effectively, the current series term $A^2$ is saved as $A^{i-1}$ referenced by p and pointer s now points to memory location 205(2) which is now free to receive the new current term during the next phase φ'.

Referring now to FIG. 5b, the second phase φ' of the process is now executed. Note that during this phase, p references memory location 205(3) while c references memory location 205(2). In 550, the 3rd series term $A^3$ is computed ($A^i=AA^{i-1}$) and stored in the memory area referenced by c (in this case 205(3)). In 560, the partial sum $S_3=A+A^2+A^3$ is computed ($S_i=S_{i-1}+A^i$).

In 570, pointers p and c are exchanged such that p now points to 205(2) and c now points to 205(3) completing the cycle and returning pointers p and c to their original state. Thus, effectively, the current series term $A^3$ is saved as $A^{i-1}$ referenced by p and pointer s now points to memory location 205(2) which is now free to receive the new current term during the next phase φ.

Figure 6:
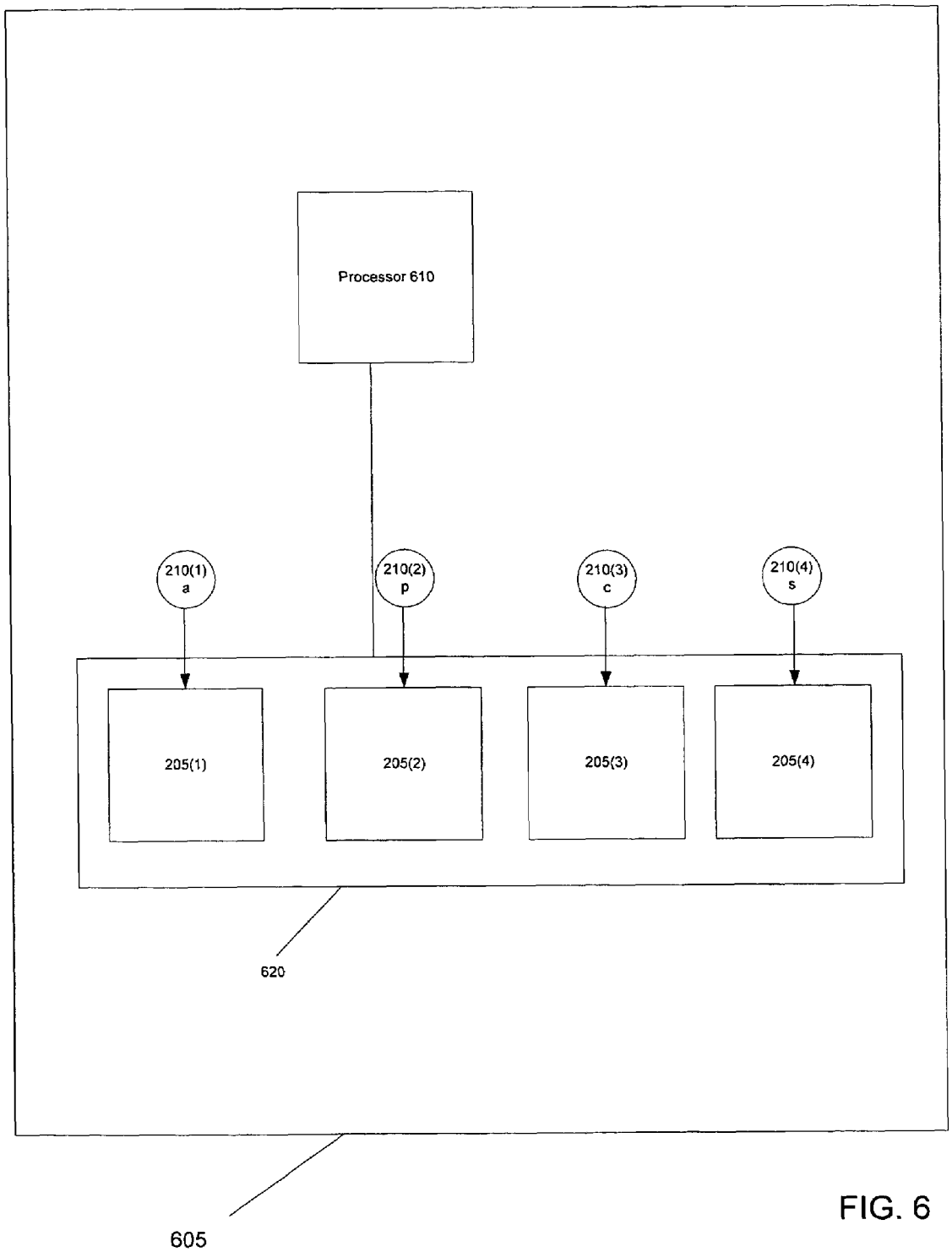
FIG. 6 is a block diagram of a system for computing a matrix power series according to one embodiment of the present invention.

FIG. 6 is a block diagram of a system for computing a matrix power series according to one embodiment of the present invention. Computation system 605 includes processor 610 and memory 620. During an initialization stage, processor 610 causes memory 620 to be allocated to memory areas 205(1)-205(4). These memory areas are referenced respectively by pointers 210(1)-210(4). Processor 610 then performs the calculation of a matrix polynomial in accordance with the methods described above.

According to one embodiment, the present invention provides a method and system for calculation of a power series involving variable coefficients, i.e., $$F(A) = \sum_{i=1}^{n} k_i A^i,$$

where A is a matrix with respective entries $a_{ij}$ and $k_i$ are scalar coefficients.

Figure 7A:
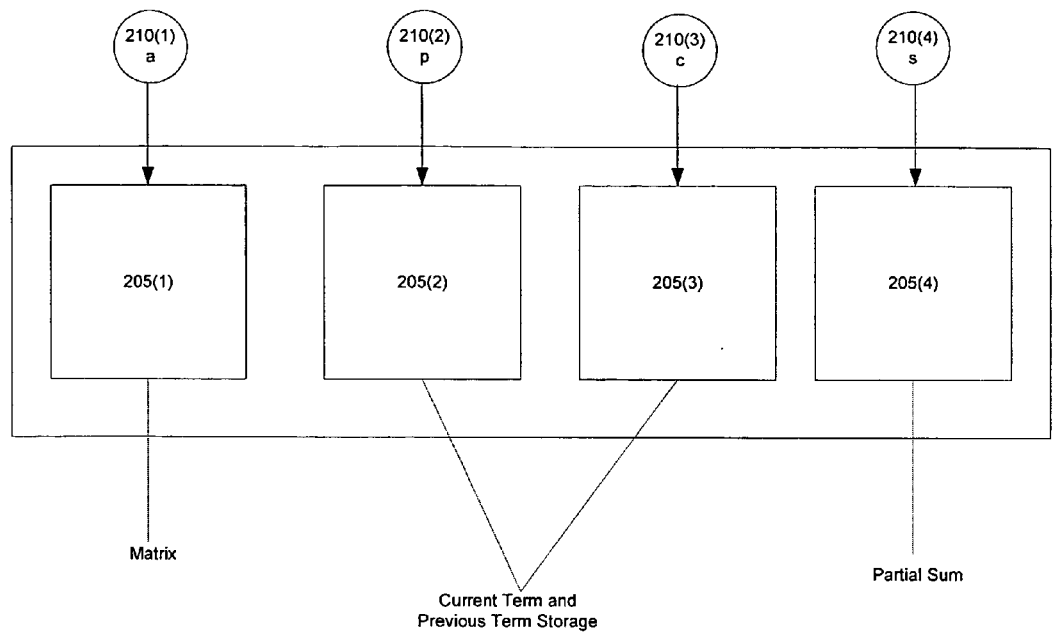
FIG. 7a is a block diagram of a memory structure for computing a matrix power series with variable coefficients according to one embodiment of the present invention.
Figure 7A:
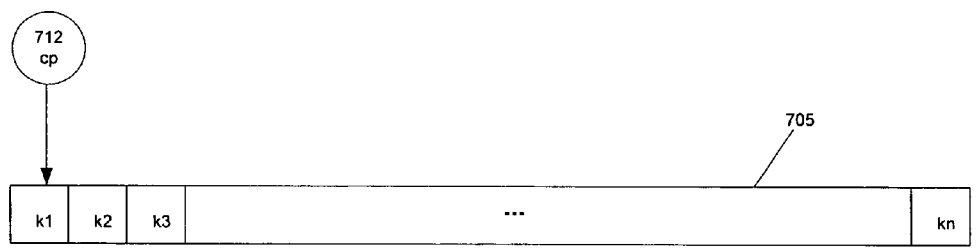

FIG. 7a is a block diagram of a memory structure for computing a matrix power series with variable coefficients according to one embodiment of the present invention. Memory areas 205(1)-205(4) and pointers 210(1)-210(4) are identical to those shown in FIG. 2. However, FIG. 7a shows coefficient vector 705 and associated pointer 712 (cp). Vector 705 stores the variable coefficients k1 ... kn. Vector pointer 712 points to a particular coefficient currently under consideration in the calculation of the power series.

Figure 7B:
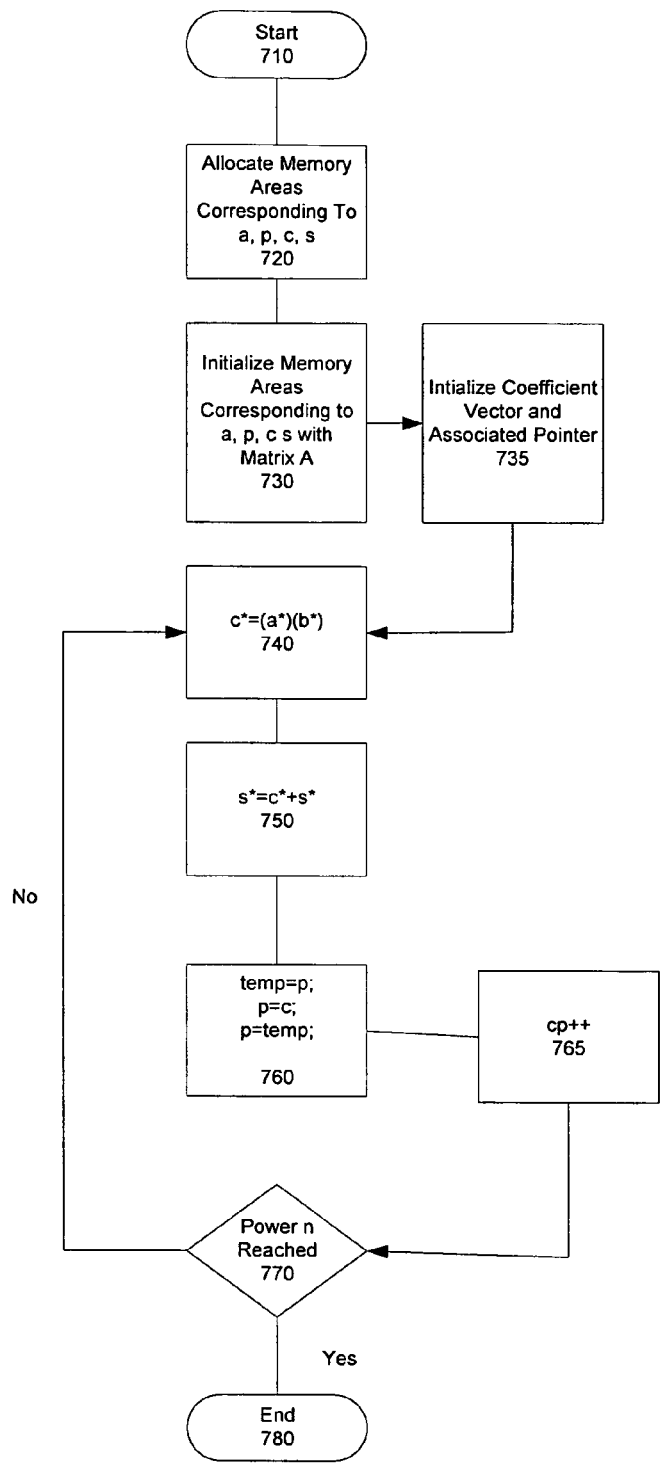
FIG. 7b is a flowchart depicting a method for calculating a power series with variable coefficients according to one embodiment of the present invention.

FIG. 7b is a flowchart depicting a method for calculating a power series with variable coefficients according to one embodiment of the present invention. The process is initiated in step 710.

Steps 720-735 relate to an initialization process. Specifically, in step 720, memory areas referenced by a for storage of the matrix (205(1)), p for storage of a current series term (205(2)), c for storage of a current term (205(3)) and s for storage of a partial sum term (205(4)) are allocated. In step 730, the matrix A is stored in memory areas referenced by a, p, c and s. In step 735 the coefficients k1 ... kn are stored in the coefficient vector 705 and the associated pointer 712 is set to point to the first element (k1).

Steps 740-770 relate to an iterative loop for the computation of a matrix power series. Specifically, in step 740 the product of the matrix A and the matrix stored in the memory location referenced by the pointer p (previous) scaled by the corresponding scalar coefficient $k_1$ ($A^i=k_iAA^{i-1}$) is stored in the memory area referenced by the pointer c (current). In step 750, the partial sum $S_i=S_{i-1}+A^i$ is computed by taking the sum of the matrix stored in memory referenced by pointer s and the matrix stored in memory referenced by pointer c. In step 760, the pointers p and s are exchanged such that p now points to the memory location storing the current series term and s now points to the memory location storing what was the previous series term. In this manner, the current series term is maintained as it is now referenced by p, while the memory location referenced by c is now ready for storage of the new current term in the next iteration.

In step 765, the coefficient pointer (cp) 712 is incremented to point to the next coefficient in the vector 705.

In step 770, it is determined whether the power n has been reached (i.e., the iteration has occurred n times). If not ('no' branch of step 770) the process continues with step 340. If so ('yes' branch of step 770), the process ends in step 780.

A method and system for efficient computation of a matrix power series has been described.

What is claimed is:

1. A computer-implemented method for optimizing memory resources of a computer during computation of an Nth order power series for a matrix, comprising:
   (a) assigning a first computer-readable memory area for storing the matrix;
   (b) assigning a second computer-readable memory area and a third computer readable memory location for storage of a previous power term and a current power term;
   (c) assigning a fourth computer-readable memory area for storage of a partial sum of the series;
   (d) assigning a first pointer to point to a current power term and a second pointer to point to a previous power term;
   (e) initializing the first, second, third and fourth memory areas;
   (f) calculating a current power term by forming the product of the matrix stored in the first memory area and the previous power term referenced by the second pointer;
   (g) storing the calculated current power term in the memory area referenced by the first pointer;
   (h) updating the partial sum stored in the fourth memory location by adding the contents of the memory area referenced by the first pointer to the partial sum stored in the fourth memory area;
   (i) updating the previous power term by exchanging the first and second pointer references;
   (j) repeating steps (f)-(h) as a function of the order N,
   wherein the memory resources of the computer are optimized by assigning only the first, second, third, and fourth computer-readable memory areas during computation of the Nth order power series for the matrix, and
   wherein the memory resources of the computer are further optimized by said repeating steps (f)-(h).

2. The method according to claim 1, wherein the initializing of the first, second, third and fourth memory areas includes the step of storing the matrix in the first, second, third and fourth memory areas.

3. The method according to claim 1, wherein the power series is calculated in order to determine a path matrix.

4. A computer-implemented method for optimizing memory resources of a computer during computation of an Nth order power series for a matrix comprising:
   (a) allocating a first computer-readable memory area and a second computer-readable memory area for storing a current and previous series term;
   (b) allocating a third computer-readable memory location for storing a partial sum;
   (c) assigning a first pointer to reference the first memory area and a second pointer to reference the second memory area;
   (d) computing a current series term;
   (e) storing the current term in the memory location referenced by the first pointer;
   (f) updating the partial sum as a function of the current term;
   (g) exchanging the first and second pointer references;
   (h) repeating steps (d)-(g) as a function of the order N,
   wherein the memory resources of the computer are optimized by allocating only the first, second, and third computer-readable memory areas during computation of the Nth order power series for the matrix, and
   wherein the memory resources of the computer are further optimized by said repeating steps (d)-(g).

5. The method according to claim 4, wherein step (d) includes the step of multiplying the matrix by a matrix stored in a memory location referenced by the second pointer.

6. The method according to claim 4, wherein step (f) includes the step of adding a previously computed partial sum to the current series term.

7. The method according to claim 4, further including the step of initializing the first, second and third memory areas includes by storing the matrix in the first, second, third and fourth memory areas.

8. The method according to claim 4, wherein the power series is calculated in order to determine a path matrix.

9. The method according to claim 4, wherein the power series is calculated in order to determine a matrix exponential.

10. A system for optimizing memory resources of a computer during computation of a matrix power series comprising:
    a computer-readable memory system for storing computation results;
    a processor, the processor adapted to:
    (a) allocate a first computer-readable memory area and a second computer-readable memory area for storing a current and previous series term;
    (b) allocate a third computer-readable memory location for storing a partial sum;
    (c) assign a first pointer to reference the first memory area and a second pointer to reference the second memory area;
    (d) compute a current series term;
    (e) store the current term in the memory location referenced by the first pointer;
    (f) update the partial sum as a function of the current term;
    (g) exchange the first and second pointer references;
    (h) repeat steps (d)-(g) as a function of an order N,
    wherein the memory resources of the computer are optimized by allocating only the first, second, and third computer-readable memory areas during computation of the Nth order power series for the matrix, and
    wherein the memory resources of the computer are further optimized by said repeating steps (d)-(g).

11. A computer-readable storage device, the storage device including instructions for optimizing memory resources of a computer which, when executed by a processor, cause the processor to perform a method comprising:
    (a) allocating a first memory area and a second memory area for storing a current and previous series term;
    (b) allocating a third memory location for storing a partial sum;
    (c) assigning a first pointer to reference the first memory area and a second pointer to reference the second memory area;
    (d) computing a current series term;
    (e) storing the current term in the memory location referenced by the first pointer;
    (f) updating the partial sum as a function of the current term;
    (g) exchanging the first and second pointer references;

(h) repeating steps (d)-(g) as a function of the order N, wherein the memory resources of the computer are optimized by allocating only the first, second, and third memory areas during computation of the Nth order power series for the matrix, and wherein the memory resources of the computer are further optimized by said repeating steps (d)-(g).

12. The computer-readable storage device according to claim 11, wherein step (d) includes the step of multiplying the matrix by a matrix stored in a memory location referenced by the second pointer.

13. The computer-readable storage device according to claim 11, wherein step (f) includes the step of adding a previously computed partial sum to the current series term.

14. The computer-readable storage device according to claim 11, the method further including the step of initializing the first, second and third memory areas by storing the matrix in the first, second, third and fourth memory areas.

15. The computer-readable storage device according to claim 11, wherein the power series is calculated in order to determine a path matrix.

16. The computer-readable storage device according to claim 11, wherein the power series is calculated in order to determine a matrix exponential.

17. A computer-implemented method for optimizing memory resources of a computer during computation of an Nth order power series for a matrix comprising:

(a) allocating a first computer-readable memory area and a second computer readable memory area for storing a current and previous series term;

(b) allocating a third computer-readable memory location for storing a partial sum;

(c) allocating a fourth computer-readable memory area for storing at least one coefficient;

(d) assigning a first pointer to reference the first memory area and a second pointer to reference the second memory area;

(e) assigning a third pointer to reference the fourth memory area;

(f) computing a current series term;

(g) storing the current term in the memory location referenced by the first pointer;

(h) updating the partial sum as a function of the current term;

(i) exchanging the first and second pointer references;

(j) incrementing the third pointer;

(k) repeating steps (f)-(j) as a function of the order N, wherein the memory resources of the computer are optimized by allocating only the first, second, third, and fourth computer-readable memory areas during computation of the Nth order power series for the matrix, and wherein the memory resources of the computer are further optimized by said repeating steps (f)-(j).

18. The method according to claim 17, wherein step (f) includes the step of multiplying the matrix by a matrix stored in a memory location referenced by the second pointer and a scalar coefficient pointed to by the third pointer.

19. The method according to claim 17, wherein step (h) includes the step of adding a previously computed partial sum to the current series term.

20. The method according to claim 17, wherein the power series is calculated in order to determine a matrix exponential $$e^A = \sum_{n=0}^{\infty} \frac{A^n}{n!}.$$

* * * * *